(12) United States Patent
Jin

(10) Patent No.: US 9,620,856 B2
(45) Date of Patent: Apr. 11, 2017

(54) BEAM BROADENING WITH LARGE SPOIL FACTORS

(71) Applicant: RAYTHEON COMPANY, Waltham, MA (US)

(72) Inventor: Michael Y. Jin, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 1179 days.

(21) Appl. No.: 13/681,255

(22) Filed: Nov. 19, 2012

(65) Prior Publication Data

US 2015/0270609 A1    Sep. 24, 2015

(51) Int. Cl.
| | |
|---|---|
| *G01S 13/90* | (2006.01) |
| *H01Q 3/30* | (2006.01) |
| *H01Q 3/28* | (2006.01) |
| *H01Q 21/22* | (2006.01) |
| *G01S 13/02* | (2006.01) |

(52) U.S. Cl.
CPC ............... *H01Q 3/30* (2013.01); *G01S 13/90* (2013.01); *H01Q 3/28* (2013.01); *G01S 2013/0254* (2013.01); *H01Q 21/22* (2013.01)

(58) Field of Classification Search
CPC . G01S 13/90; G01S 2013/0254; H01Q 21/22; H01Q 3/28; H01Q 3/30
USPC .................................................. 342/371, 372
See application file for complete search history.

(56) References Cited

U.S. PATENT DOCUMENTS

| | | | |
|---|---|---|---|
| H910 H | 4/1991 | Hindenach | |
| 5,153,600 A | 10/1992 | Metzler et al. | |
| 6,218,987 B1 | 4/2001 | Derneryd et al. | |
| 7,277,042 B1* | 10/2007 | Cho | G01S 7/00 342/165 |
| 2010/0099370 A1* | 4/2010 | Nichols | H01Q 1/3275 455/129 |
| 2011/0205121 A1* | 8/2011 | Hochdorf | G01S 7/025 342/375 |
| 2012/0068880 A1* | 3/2012 | Kullstam | G01S 3/38 342/54 |
| 2012/0133549 A1 | 5/2012 | Culkin et al. | |

OTHER PUBLICATIONS

Stirland, "Fast Antenna Synthesis by an Iterative FFT Procedure", Microwave Conference, 1991, 21st European, IEEE, Piscataway, Sep. 9, 1992 (pp. 745-750).*

(Continued)

*Primary Examiner* — Timothy A Brainard
(74) *Attorney, Agent, or Firm* — Lewis Roca Rothgerber Christie LLP

(57) ABSTRACT

Methods for generating weights for the antenna elements (110) in an AESA antenna (100). In one embodiment, transmitting weights are selected to have unit amplitude and quadratic phase, and receiving weights are selected to provide a two-way antenna pattern which is uniform over a useful portion (300) of the main lobe, and decreases rapidly outside of the uniform portion. In another embodiment the transmitting weights have unit amplitude over a central portion of the array and the receiving weights are selected to provide a two-way antenna pattern which is uniform over a useful portion (300) of the main lobe.

19 Claims, 14 Drawing Sheets

(56) References Cited

OTHER PUBLICATIONS

Mofrad, et al., "Comparison of Antenna Beam Broadening Methods for Phased Array Radar Applications", Antennas and Propagation conference (LAPC), 2011, Loughborough, IEEE, Nov. 14, 2011 (pp. 1-4).
Xiangneng, et al., "Practical Beam Broadening for Space-Borne SAR Using Phase-Only Pattern Synthesis", Wireless Communications and Signal Processing (WCSP), 2011 International Conference on, IEEE, Nov. 9, 2011, (pp. 1-4).
Written Opinion of the International Searching Authority for International Application No. PCT/US2013/061496, filed Sep. 24, 2013, Written Opinion of the International Searching Authority mailed Mar. 27, 2014 (9 pgs.).
International Search Report for International Application No. PCT/US2013/061496, filed Sep. 24, 20134, International Search Report dated Mar. 18, 2014 and mailed Mar. 27, 2014 (3 pgs.).
International Preliminary Report on Patentability from corresponding International Application No. PCT/US2013/061496, International Preliminary Report on Patentability dated May 19, 2015 and mailed May 28, 2015 (11 pgs).

* cited by examiner

BEAM BROADENING WITH LARGE SPOIL FACTORS

BACKGROUND

1. Field

One or more aspects of embodiments according to the present invention relate to antenna beam shaping and more particularly to methods of providing a broadened beam with large spoil factors using an actively electronically scanned array antenna.

2. Description of Related Art

Large actively electronically scanned array (AESA) antennas are commonly used in intelligence, surveillance, and reconnaissance (ISR) radar systems, where such antennas provide improved resolution angle and the ability to transmit high power, and to distinguish slow-moving targets from stationary ones. Large antennas are also capable of forming narrower transmitting and receiving beams or, equivalently, an antenna pattern with a narrow main lobe.

In synthetic aperture radar (SAR), if the signal processor has sufficient power, a wide antenna pattern is preferred, as it results in better mapping efficiency, i.e., an improved rate of mapping the ground. Moreover, it is desirable that the product of the transmitting and receiving antenna patterns, referred to herein as the TR pattern, be nearly uniform over the main beam, and that it have low sidelobes, making it possible to use a relatively low pulse-repetition frequency for a given beam width.

The antenna pattern of an array can be adjusted by setting the array element transmitting and receiving weights, a process also known as selecting a taper. The transmitting weight for an array element is the complex coefficient by which the transmitted signal is multiplied before being transmitted by that element; the receiving weight for the element is the complex coefficient by which the signal received by that element is multiplied before being combined with the corresponding signals from other array elements. The weights, being complex numbers, may be represented as a magnitude, which may be referred to as an amplitude, and a phase.

Prior art beam broadening approaches include selecting transmitting and receiving weights the phase of which varies quadratically across the array. For a planar AESA antenna, such weights have the effect of generating curved wave fronts, and a wide beam. This approach, however, is limited by ripple in the main lobe, which becomes unacceptable, for SAR applications, for beams broadened by more than 100%, i.e., by more than a factor of two. There is a need, then, for a beam broadening approach which generates broad beams with acceptable main lobe ripple.

SUMMARY

Embodiments of the present invention provide methods for generating broad, high-quality beams for SAR applications. In particular, the present invention provides methods for generating weights for use with an AESA antenna resulting in a two-way antenna pattern with a broad, uniform main lobe, and a fast sidelobe drop rate. Embodiments of the present invention also provide low power loss during transmission, and a two-way antenna pattern with substantially uniform phase across the main lobe.

According to an embodiment of the present invention there is provided a method for configuring an active electronically scanned array (AESA) antenna to generate a uniform two-way antenna pattern, the antenna having an array of antenna elements, the method including: selecting transmitting weights having substantially uniform amplitude over a portion of the array; computing a transmitting antenna pattern; selecting a range of angles over which the uniform two-way antenna pattern is to be achieved; computing a desired receiving antenna pattern; computing receiving weights from the desired receiving antenna pattern; and programming the AESA antenna with the transmitting weights and the receiving weights.

In one embodiment, the computing of a desired receiving antenna pattern from the transmitting antenna pattern comprises computing the desired receiving antenna pattern as the ratio of the uniform two-way antenna pattern to the transmitting antenna pattern.

In one embodiment, the computing of a desired receiving antenna pattern from the transmitting antenna pattern comprises raising the value of the transmitting antenna pattern at each point to a power.

In one embodiment, the power is between −1 and −3.

In one embodiment, the selecting of transmitting weights having substantially uniform amplitude over a portion of the array includes selecting transmitting weights having substantially uniform amplitude over the entire array.

In one embodiment, the selecting of transmitting weights having substantially uniform amplitude over a portion of the array further includes selecting transmitting weights having substantially quadratic phase over the portion of the array.

In one embodiment, the selecting of a range of angles over which the uniform two-way antenna pattern is to be achieved includes selecting a range of angles over which the amplitude of the transmitting antenna pattern falls short of the maximum amplitude of the transmitting antenna pattern by less than a threshold amount.

In one embodiment, the threshold amount is 3 dB.

In one embodiment, the computing of a transmitting antenna pattern includes performing a fast Fourier transform and a circular shift.

In one embodiment, the computing of receiving weights includes performing a fast Fourier transform and two circular shifts.

In one embodiment, the selecting of transmitting weights having substantially uniform amplitude over a portion of the array includes selecting transmitting weights having uniform, unit amplitude over a central portion of the array, and decreasing to substantially zero over transition regions on each side of the central portion.

In one embodiment, the selecting transmitting weights having uniform, unit amplitude over a central portion of the array, and decreasing to substantially zero over transition regions on each side of the central portion includes selecting transmitting weights decreasing to substantially zero following a constrained least squares function over transition regions on each side of the central portion.

In one embodiment, the central portion of the array includes at least the central one quarter of the array, and at most the central three quarters of the array.

In one embodiment, the uniform two-way antenna pattern has substantially constant phase over the range of angles.

According to an embodiment of the present invention there is provided an active electronically scanned array (AESA) antenna, including: an array of antenna elements; a plurality of phase and amplitude control circuits for producing a transmitting antenna pattern, a receiving antenna pattern, and a two-way antenna pattern; a plurality of transmitting weights for setting the relative amplitude and phase of the signal transmitted by each array element; and a plurality of receiving weights for setting the relative amplitude and phase of the signal received by each array element; wherein: the transmitting weights have substantially uniform amplitude over a portion of the array; and the receiving weights are selected to produce a receiving antenna pattern which, over a range of angles, is the ratio of (i) a desired two-way antenna pattern to (ii) a computed transmitting antenna pattern corresponding to the transmitting weights, wherein the desired two-way antenna pattern has substantially uniform amplitude over the range of angles.

In one embodiment, the transmitting weights have substantially uniform amplitude over the entire array.

In one embodiment, within the range of angles, the amplitude of the transmitting antenna pattern differs from the maximum amplitude of the transmitting antenna pattern by less than a threshold amount.

In one embodiment, the threshold amount is 3 dB.

In one embodiment, the computed transmitted antenna pattern is a circularly shifted fast Fourier transform of the transmitting weights.

In one embodiment, the transmitting weights have uniform, unit amplitude over a central portion of the array, and amplitude decreasing to substantially zero over transition regions on each side of the central portion.

In one embodiment, the transmitting weights in the transition regions are a constrained least squares function of angle.

In one embodiment, the central portion of the array includes at least the central one quarter of the array, and at most the central three quarters of the array.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of the presently preferred embodiments of methods of providing a broadened beam with large spoil factors, provided in accordance with the present invention, and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
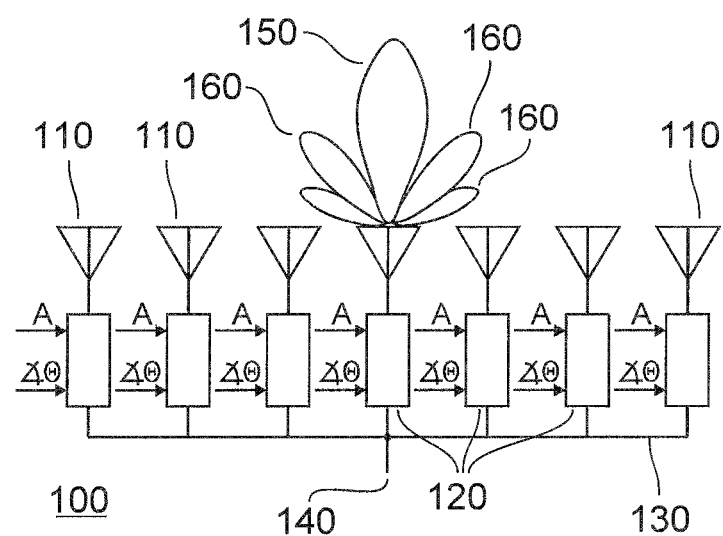
FIG. 1 is a schematic diagram of an AESA antenna in which each element has transmitting and receiving amplitude and phase weights according to an embodiment of the present invention.

Referring to FIG. 1, an AESA antenna 100 includes several array elements 110, connected to transmit-receive modules 120. The transmit-receive modules 120 may be connected, through a splitter-combiner network 130, to a shared input-output port which may be referred to as the RF I/O port 140. When the antenna is transmitting, the amplitude and phase of the signal radiated by each antenna element, relative to the amplitude and phase of the signal at the RF I/O port 140, may be determined by variable-delay and variable-gain components along the signal path. Although in FIG. 1 these variable-delay and variable-gain components are shown, by the symbols "A" and "Θ" as integral to the transmit-receive modules 120, they may be incorporated elsewhere in the antenna, as in the splitter-combiner network. The net effect, at each antenna element, of the variable-delay and variable-gain components may be represented by a single complex number referred to herein as the transmitting weight for that array element.

Similarly, when the antenna is receiving, the amplitude and phase, of the contribution to the signal at the RF I/O port 140 from a particular array element, relative to the amplitude and phase of the electromagnetic waves received by that element, may be expressed as a complex number referred to as the receiving weight for that element.

The amplitude and phase of the far field waves transmitted or received by an antenna as a function of azimuth and elevation may be referred to as the transmitting or receiving antenna pattern, respectively. An antenna pattern may be characterized by a main lobe 150 and sidelobes 160, where, when the antenna is transmitting, the main lobe may contain the direction of maximum radiant intensity, and may contain most of the power radiated by the antenna. The main lobe may also be referred to as the beam. The transmitting antenna pattern may differ from the receiving antenna pattern. For SAR applications, because the received signal of interest is the transmitted signal after reflection from the target, the product of the transmitting antenna pattern and the receiving antenna pattern, which is referred to as the two-way antenna pattern, is of particular interest.

Several approaches are known in the prior art for broadening, or spoiling, the beam of an array antenna, to produce a beam that is broader than the beam corresponding to uniform weights, which may be referred to as an unweighted beam. The ratio of the width of the spoiled beam to the width of an unweighted beam may be referred to as the spoil factor.

One class of approaches to beam broadening results in a unimodal beam, i.e., a main lobe which has inverted quadratic amplitude A as a function of the angle θ from the center of the main lobe, i.e., $A(\theta)=A_0(1-\alpha\theta^2)$, over a significant portion of its angular extent. Taylor weights, for example, produce a unimodal antenna pattern; Taylor weights have equal phase and amplitude decreasing smoothly from a maximum value at the center of the array to near zero at its edge. The use of Taylor weights to broaden an antenna beam is an example of the principle that reducing the effective width of an antenna results in a broader beam. The use of weights, such as Taylor weights, with amplitudes of less than unity to broaden a beam has the disadvantage that the maximum total power radiated by the antenna when transmitting is reduced, because array elements near the edge of the array are radiating at reduced power levels.

Another prior art approach to beam broadening, which avoids a reduction in total transmitted power, is the use of phase weights, i.e., weights with unit amplitude and with phase that varies across the array. Quadratic phase weights, i.e., weights the phase of which is a quadratic function of position on the array, may be used, for example, to cause a flat array to radiate waves with convex wave fronts, resulting in a broad far field beam. This technique may be used to broaden the beam by approximately 100%, i.e., by a factor of two; for greater spoil factors the ripple within the main lobe is unacceptable for use in SAR.

In one prior art approach a two-way beam with low sidelobes is achieved while using transmitting weights with unit amplitude, by selecting receiving weights that produce a receiving antenna pattern with low sidelobes.

Figure 2:
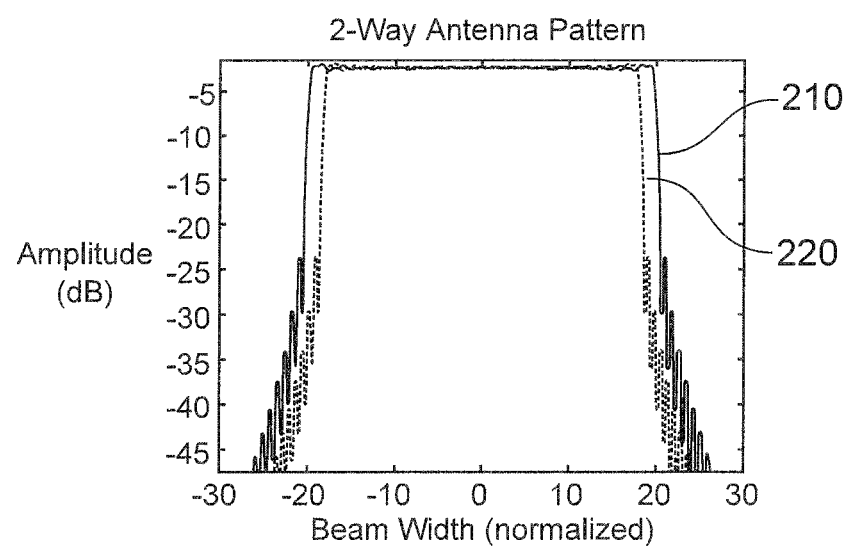
FIG. 2 is a two-way antenna pattern, generated at two different frequencies according to an embodiment of the present invention.

For SAR applications an antenna pattern with a uniform main lobe, i.e., a main lobe that has substantially constant amplitude across a large range of angles, may be desirable. Referring to FIG. 2, the amplitude of such an antenna pattern may have significantly reduced frequency dependence across most of the main lobe. The low-frequency antenna pattern 210 may, for example, be nearly flat over a significant range of angles, and the high-frequency pattern 220 may be essentially flat, with the same amplitude, across a slightly smaller range of angles, so that the difference between the antenna patterns at the two frequencies may be negligible except over a small range of angles at both outer edges of the main lobe. By comparison, if the main lobe amplitude is a curved function of angle such as an inverted quadratic, the difference between antenna patterns for the two frequencies may be significant at all angles within the main lobe except for a narrow range of angles near the center.

Other characteristics are also desirable in a two-way antenna pattern for SAR applications. These characteristics include low ripple and uniform phase in main lobe of the two-way antenna pattern, high power efficiency, and a fast sidelobe drop rate, which permits operation with a lower ratio of pulse repetition frequency (PRF) to main lobe bandwidth.

Figure 3:
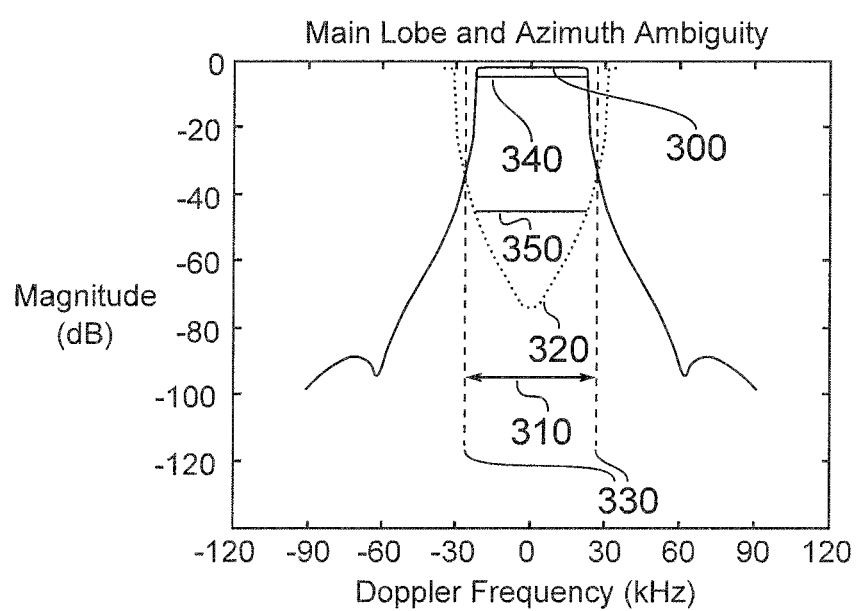
FIG. 3 is a graph of a two-way antenna pattern generated according to an embodiment of the present invention, showing signal from beyond the pulse repetition frequency folded into the beam.
Figure 4A:
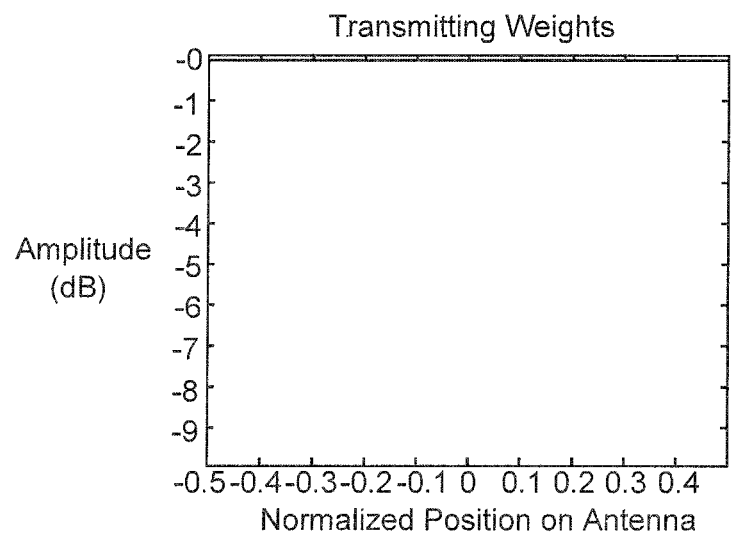
FIG. 4A is a graph of the amplitude of a set of transmitting weights selected according to an embodiment of the present invention.
Figure 4B:
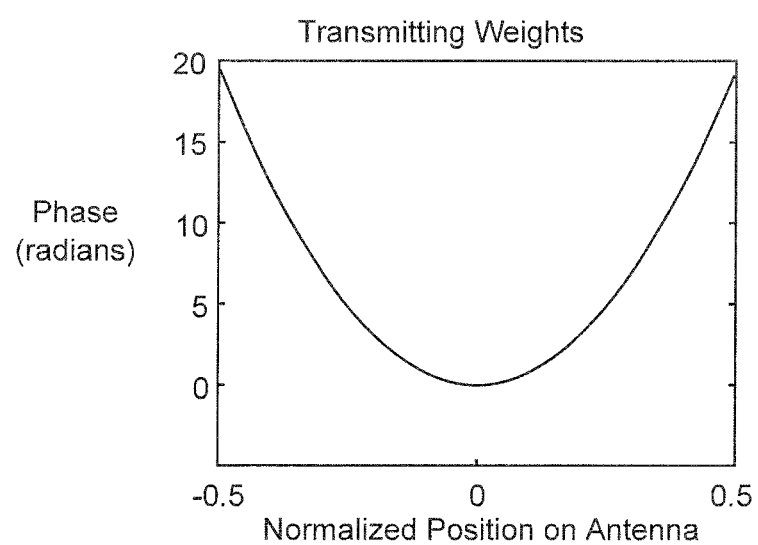
FIG. 4B is a graph of the phase of a set of transmitting weights selected according to an embodiment of the present invention.
Figure 4C:
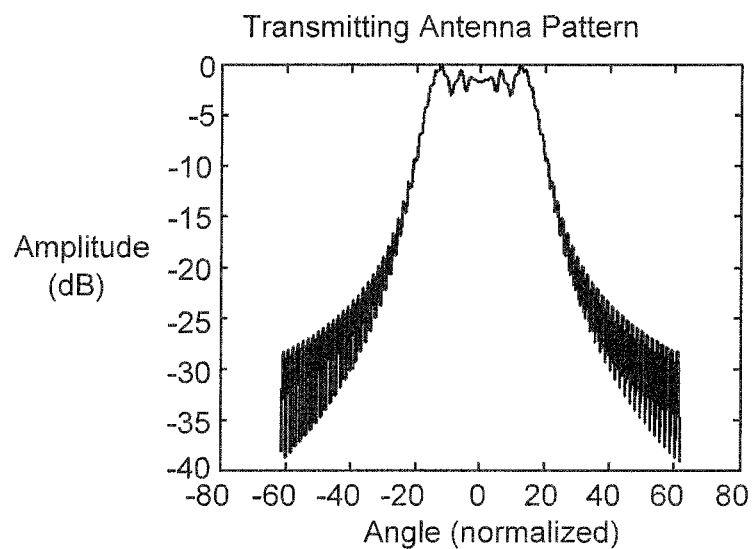
FIG. 4C is a graph of the amplitude of the computed transmitting antenna pattern corresponding to the weights of FIGS. 4A and 4B.
Figure 4D:
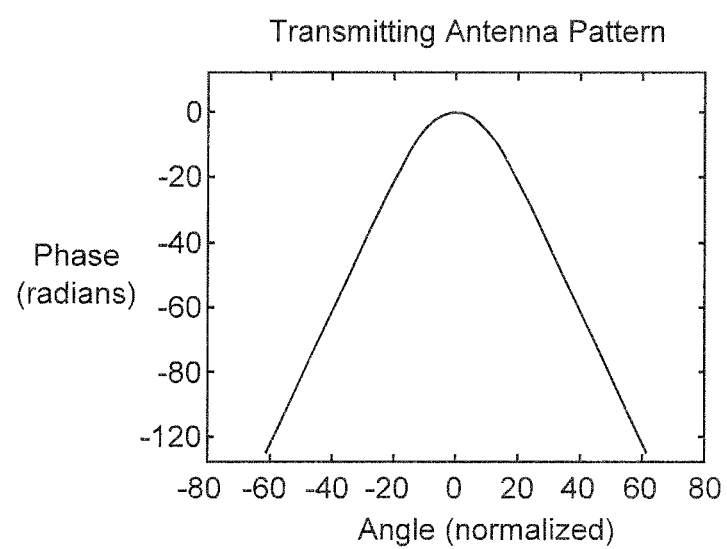
FIG. 4D is a graph of the phase of the computed transmitting antenna pattern corresponding to the weights of FIGS. 4A and 4B.

Main lobe ripple, i.e., amplitude variation across the usable part of the main lobe, degrades the SAR image, or requires more complex signal processing to compensate for its effects. Moreover, main lobe ripple reduces the signal to noise ratio (SNR) at angles where the amplitude is lower, which compromises the quality of the image in a manner that cannot readily be corrected with signal processing. As a result, in one embodiment, only the portion of the main lobe within which the two-way antenna pattern amplitude varies by less than 3 dB is used. This portion may be referred to as the useful portion 300 of the main lobe (FIG. 3).

Similarly, non-uniform phase across the main lobe may compromise SAR image quality, and may necessitate a computationally costly phase correction in the processing of the return signal.

Power efficiency is important when the antenna is transmitting, because the power that each array element is capable of radiating may be limited by the power amplifier driving it, and because the SAR image SNR is improved with higher total power. When the antenna is transmitting, efficiency may be lost as a result of two mechanisms, power loss and weight loss. Power loss is given by $$L_{power}^t = \frac{1}{K}\sum_{k=1}^{K}|w_t(k)|^2,$$

where the amplitude of each of the transmitting weights $w_t(k)$ is between zero and unity. The transmitting weights are normalized so that when a unit amplitude weight is used the corresponding transmit-receive module is transmitting at maximum power; as a result these weights cannot exceed unit amplitude.

The transmitting weight loss, which quantifies the extent to which power at the center of the main lobe is reduced as a result of this power being redirected to other angles, is given by $$L_{weight}^t = \frac{\left|\frac{1}{K}\sum_{k=1}^{K} w_t(k)\right|^2}{\frac{1}{K}\sum_{k=1}^{K} |w_t(k)|^2}.$$

The amplitude of the receiving weights $w_r(k)$ may exceed unity, and the only loss when the antenna is receiving is the receiving weight loss, given similarly by $$L_{weight}^r = \frac{\left|\frac{1}{K}\sum_{k=1}^{K} w_r(k)\right|^2}{\frac{1}{K}\sum_{k=1}^{K} |w_r(k)|^2}.$$

A fast sidelobe drop rate is beneficial in that it allows a lower PRF to be used, and a lower PRF is preferred because a high PRF may lead to range ambiguity. Referring to FIG. 3, the antenna pattern may be plotted as a function of azimuth angle. Azimuth angle corresponds to Doppler frequency according to the equation $f_D=2v \sin(\phi)/\lambda$, where $v$ is the forward velocity of the aircraft, $\phi$ is the azimuth angle, and $\lambda$ is the radar wavelength. Radar returns at Doppler frequencies exceeding half of the PRF 310 fold into the beam, are indistinguishable from signal returning in the beam, and, unless their amplitude is small, may cause undesirable ghosts in the resulting SAR image. FIG. 3 illustrates a PRF 310 which is sufficient to reduce the contribution from the folded in signal 320 by 40 dB relative to the signal from the useful portion 300 of the main lobe. In the graphical construction of FIG. 3, mirror lines 330 are drawn separated by the PRF and centered on the beam, and the signal outside of the mirror lines is sketched folded into the region between the mirror lines as shown. To evaluate whether the folded in signal 320 is 40 dB below the desired signal, a minimum main beam amplitude line 340 is drawn horizontally at the level of the lowest amplitude within the useful portion 300 of the main lobe, and a 40 dB threshold line 350 is drawn 40 dB lower. If, as is the case in FIG. 3, the folded in signal 320 falls below the 40 dB threshold line 350, then within the useful portion 300 the folded in signal 320 is at least 40 dB below the desired signal.

FIG. 3 illustrates the benefit of a wide, uniform beam, in that it makes a lower PRF possible. If the two-way antenna pattern were to curve down more gradually, the PRF would need to be chosen significantly higher, relative to the useful portion of the main lobe, to cause the folded in signal to fall at least 40 dB below the desired signal everywhere within the useful portion.

Desirable antenna pattern characteristics may be achieved to some extent using quadratic phase weights, i.e., a set of weights with uniform amplitude and with phase that varies quadratically with position on the array. Quadratic phase weights generate a beam with a spoil factor proportional to the difference between the phase at the center of the array and the phase at the edge of the array.

Under suitable assumptions the far-field antenna pattern is approximately equal to the Fourier transform of the weights. For quadratic phase weights the amplitude profile of the far-field pattern is a Fresnel integral, which is nearly flat within a central window and much lower outside of this window. Quadratic phase weights are particularly well suited for use as transmitting weights, because, all of the weights having unit amplitude, the power loss for quadratic phase weights is zero.

Referring to FIGS. 4A-4D, transmitting weights of uniform amplitude (FIG. 4A) and quadratic phase with an edge phase of $19\pi$ (FIG. 4B) generate a transmitting antenna pattern with a 3 dB beamwidth 30 times wider than the unweighted beam (the horizontal axes in FIGS. 4A-4D are normalized to the width of the unweighted beam). Although this beam shape is superior to that produced using, e.g., Taylor weights, the transmitting antenna pattern illustrated in FIG. 4C has a peak-to-peak ripple of 3 dB, which is considered to be too large for SAR applications, in part because in combination with similar ripple in the receiving antenna pattern the total ripple in the two-way antenna pattern could approach 6 dB. This peak-to-peak ripple in the two-way antenna pattern may, however, be greatly reduced in the two way antenna pattern, by designing the receiving antenna pattern to compensate for the ripple of the transmitting antenna pattern.

Figure 5:
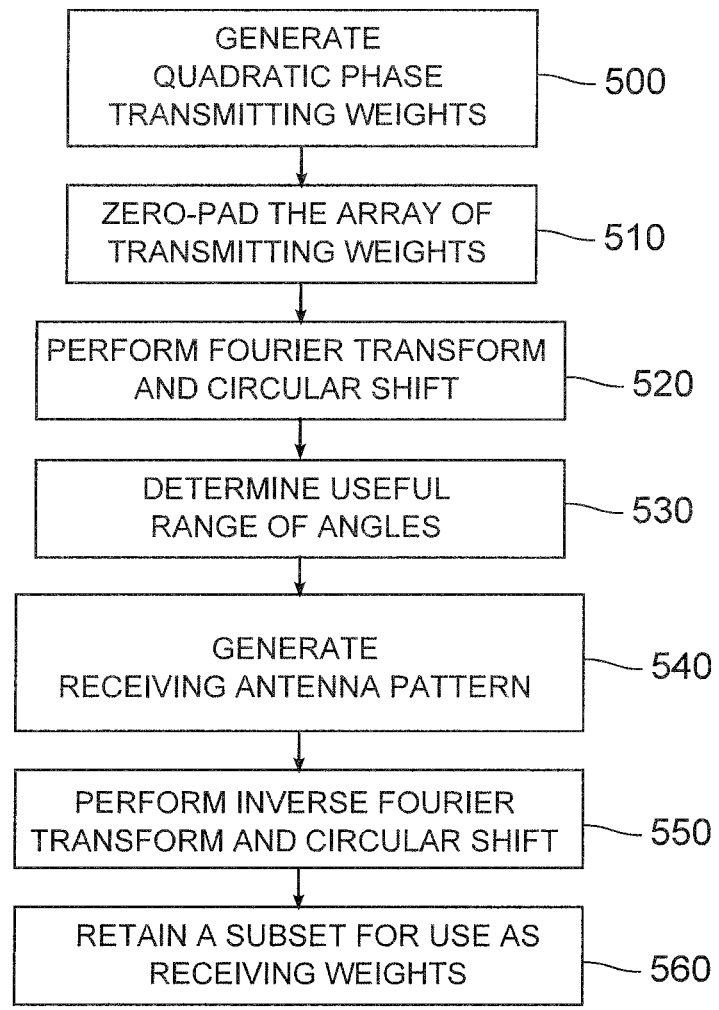
FIG. 5 is a flowchart illustrating a method for generating transmitting and receiving weights according to an embodiment of the present invention.
Figure 6A:
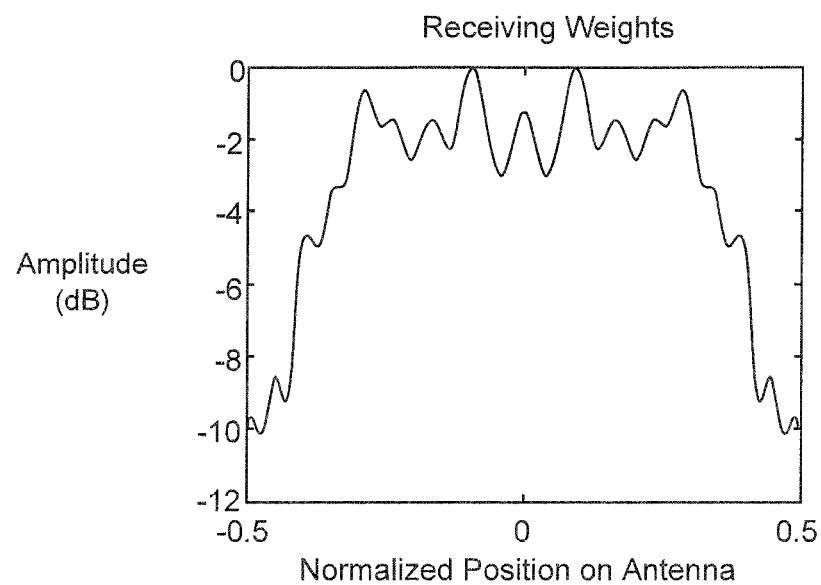
FIG. 6A is a graph of the amplitude of a set of receiving weights calculated for the transmitting weights of FIGS. 4A and 4B according to an embodiment of the present invention.
Figure 6B:
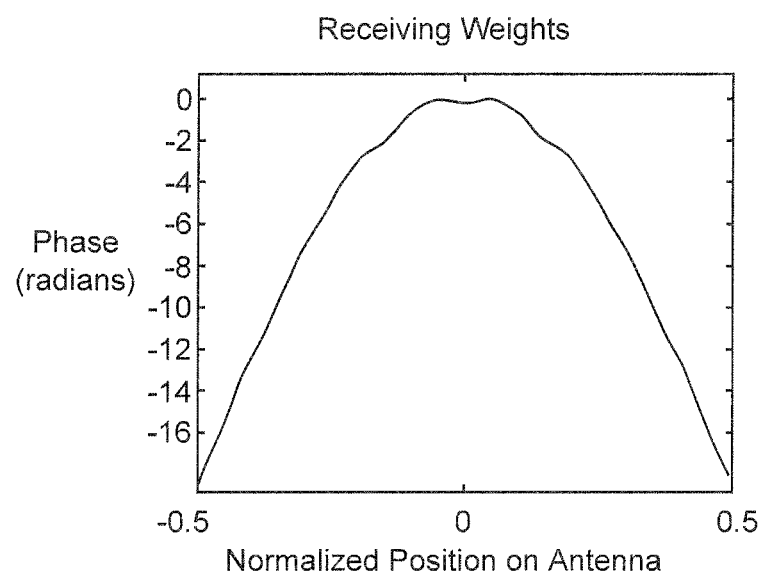
FIG. 6B is a graph of the phase of a set of receiving weights calculated for the transmitting weights of FIGS. 4A and 4B according to an embodiment of the present invention.
Figure 6C:
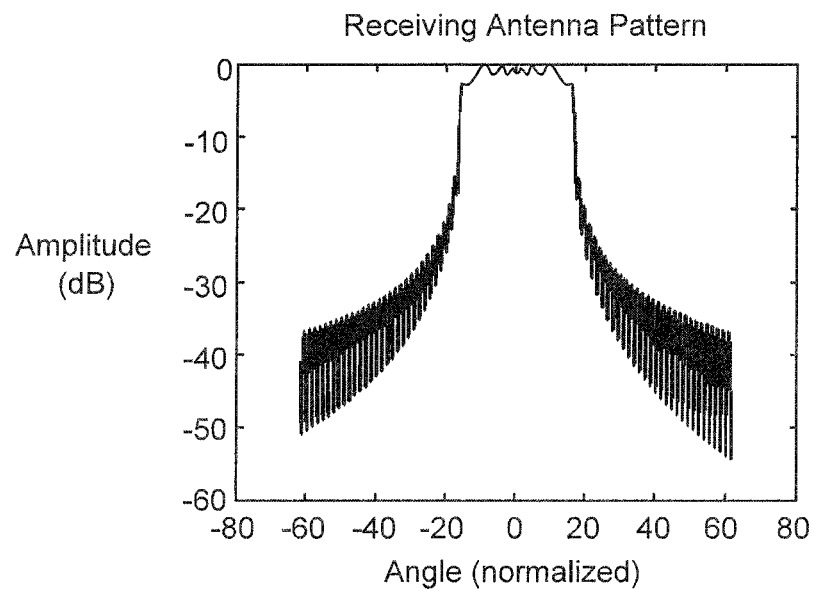
FIG. 6C is a graph of the amplitude of the computed receiving antenna pattern corresponding to the weights of FIGS. 6A and 6B.
Figure 6D:
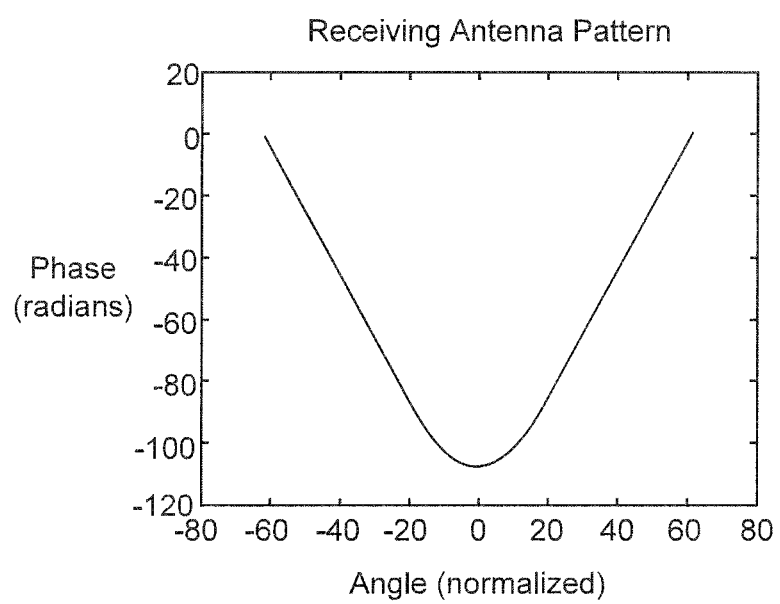
FIG. 6D is a graph of the phase of the computed receiving antenna pattern corresponding to the weights of FIGS. 6A and 6B.

In particular, this may be accomplished using the following weight-generating algorithm, which is based on the concept of the inverse filter, and the results of which are illustrated in FIGS. 6A-6D. Referring to FIG. 5, the weight-generating algorithm comprises the following steps:

In a first step 500, the algorithm generates quadratic phase weights for the transmitting antenna pattern. The number of weights, i.e., the size of the array of weights, equals the number K of antenna radiating array elements. For a beam broadening factor of $\alpha$ these weights are given by $$w_t(k) = \exp\left\{j\frac{\pi\alpha}{K^2}\left(k - \frac{K}{2}\right)^2\right\},$$

$$k = 1, 2, \ldots, K$$

In step 510, the algorithm zero-pads the array of transmitting weights to expand its size by a factor of N, where N is an integer power of 2:

$$w_{t1}(k) = \begin{cases} w_t(k + K/2), & k = 1, 2, \ldots, K/2 \\ w_t(k - N \cdot K + K/2), & k = N \cdot K - K/2 + 1, \ldots, N \cdot K \\ 0, & k = K/2 + 1, \ldots, N \cdot K - K/2 \end{cases}$$

In step 520, the algorithm performs a Fourier transform and a circular shift to compute the transmitting antenna pattern G(n), i.e., $$G(n) = \text{FFTshift}(\text{FFT}(w_{t1}(k)))$$

where FFT denotes the fast Fourier transform and the shifting function FFTshift is defined by $$\text{FFTshift}(A(n)) = \begin{cases} A\left(n + \frac{N \cdot K}{2}\right), & n = 1, 2, \ldots, \frac{N \cdot K}{2} \\ A\left(n - \frac{N \cdot K}{2}\right), & n = \frac{N \cdot K}{2} + 1 \ldots, N \cdot K \end{cases}$$

In step 530, the algorithm determines the range of angles within the useful portion of the main lobe of the computed transmitting antenna pattern. This useful portion may be defined, for example, as the range of angles outside of which the computed transmitting amplitude is below −3 dB, and lower and upper limits of the range may be referred to as $-n_{3dB}$ and $n_{3dB}$ respectively.

In step 540, the algorithm generates the desired receiving antenna pattern $G^{inv}(n)$. This may be, for example, the reciprocal of the computed transmitting antenna pattern (or, equivalently, the ratio of the desired, uniform two-way antenna pattern to the computed transmitting antenna pattern) within the useful portion of the main lobe, and zero elsewhere:

$$G^{inv}(n) = \begin{cases} G^{-1}(n), & (N \cdot K/2 - n_{3dB}/2) - 1 < n < (N \cdot K/2 + n_{3dB}/2) \\ 0, & \text{elsewhere} \end{cases}$$

More generally, the desired receiving antenna pattern may be found from the following equation:

$$G^{inv}(n) = \begin{cases} G^{-1+\delta}(n), & (N \cdot K/2 - n_{3dB}/2) - 1 < n < (N \cdot K/2 + n_{3dB}/2) \\ 0, & \text{elsewhere} \end{cases},$$

where $\delta$ is a fine tuning parameter which may be adjusted to optimize the two-way antenna pattern. The special case in which the desired receiving antenna pattern is the reciprocal of the computed transmitting antenna pattern then corresponds to setting $\delta=0$. Other values of $\delta$, in the range $-2 < \delta < 0$, may provide improved performance, especially for smaller spoil factors, which may be in the range of 12 to 16. This range of values of $\delta$ corresponds to raising G to a power in the range between −1 and −3.

In step 550, the algorithm performs an inverse fast Fourier transform of the receiving antenna pattern, i.e., $$w_{r1}(k) = \text{FFTshift}(\text{IFFT}(\text{FFTshift}(G^{inv}(n))))$$

where IFFT denotes the inverse fast Fourier transform.

In step 560, the algorithm retains K values around the center of the array $w_{r1}(k)$; these are the receiving weights:

$$w_r(k) = w_{r1}(k+(N \cdot K-K)/2) \text{ for } k=1,2,\ldots K.$$

Referring to FIGS. 6A-6D, the algorithm described above, when applied to the transmitting weights and transmitting antenna pattern of FIGS. 4A-4D, results in a receiving antenna pattern which, like the transmitting antenna pattern, has a broad central region within which the amplitude is, except for a certain amount of ripple, constant and near unity.

Figure 7A:
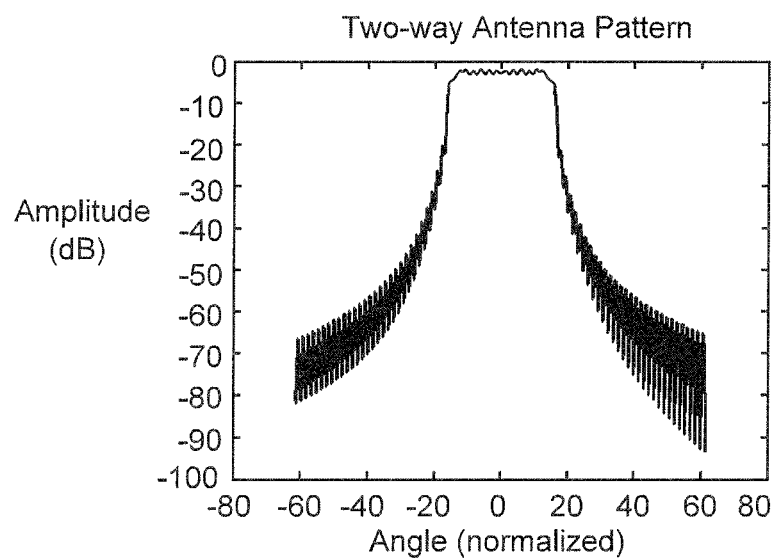
FIG. 7A is a graph of the amplitude of the two-way antenna pattern according to an embodiment of the present invention.
Figure 7B:
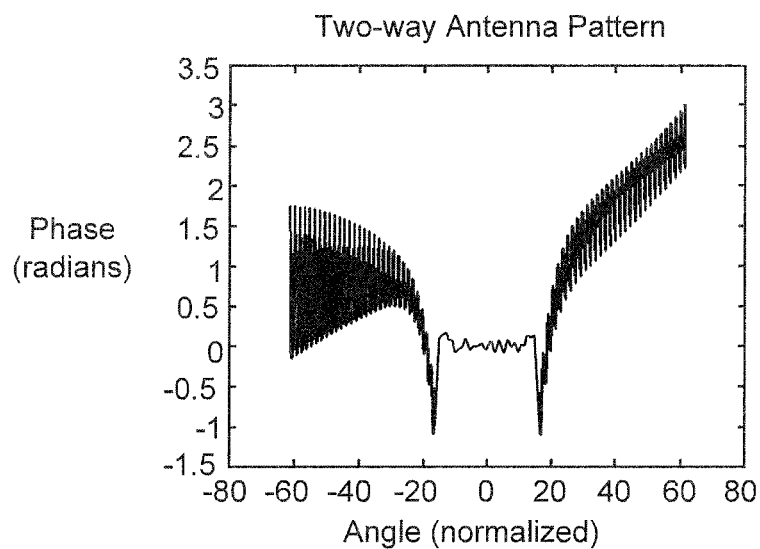
FIG. 7B is a graph of the phase of the two-way antenna pattern according to an embodiment of the present invention.

Referring to FIGS. 7A and 7B, the product of the transmitting and receiving antenna patterns of FIGS. 4C-4D and FIGS. 6C-6D respectively is the two-way antenna pattern. The two-way antenna pattern has an amplitude with significantly reduced ripple within the useful portion of the main lobe and a fast sidelobe drop rate (FIG. 7A), and a phase that is near zero within the useful portion of the main lobe (FIG. 7B).

Moreover, the choice of uniform amplitude transmitting weights in this embodiment allows each transmitting amplifier to be exercised at full capacity, and the maximum total transmitted power the antenna is capable of is transmitted.

Figure 8A:
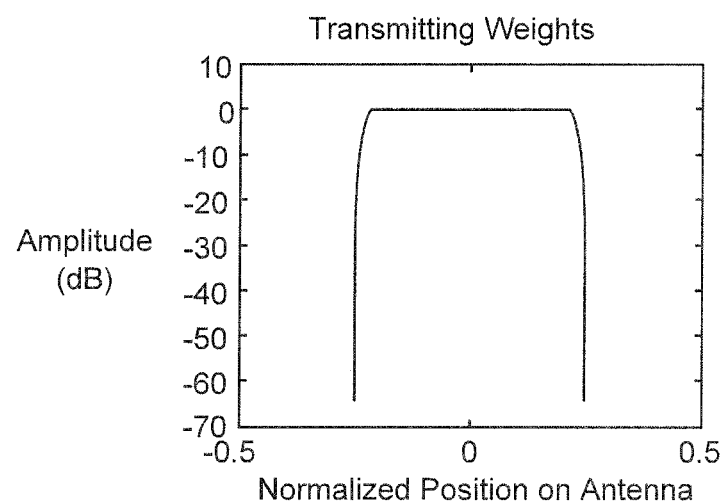
FIG. 8A is a graph of the amplitude of a set of transmitting weights selected according to an embodiment of the present invention.
Figure 8B:
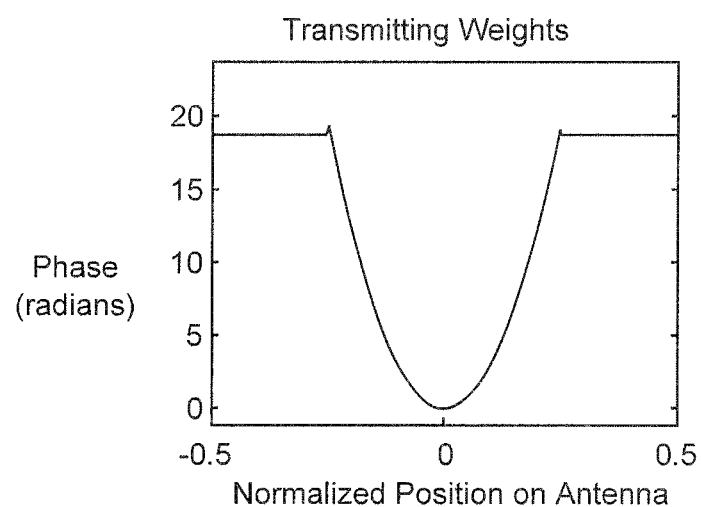
FIG. 8B is a graph of the phase of a set of transmitting weights selected according to an embodiment of the present invention.

Referring to FIGS. 8A-8D, in another embodiment, further improvements in the two-way antenna pattern may be achieved by relaxing the constraint that the transmitting weights all have unit amplitude. In one embodiment, the amplitude of the transmitting antenna weights may be unity over a central region spanning approximately one half of the width of the array and may drop rapidly to zero in transition regions outside of the central region, following, in each transition region, a constrained least squares (CLS) profile (FIG. 8A). As in the embodiment of FIGS. 4A-4D, the phase of the nonzero transmitting weights may be quadratic, with the amount of quadratic phase, i.e., the difference between the phase at the center of the array and at the edge of the central region, selected to produce the desired spoil factor $\alpha$. In particular, the transmitting weights may be given by $$w_t(k) = CLS\left(k, \frac{K}{4}+1, \frac{K}{4}+0.035K, \frac{3K}{4}-0.035K, \frac{3K}{4}\right) \times$$
$$Rect\left(k, K, \frac{K}{2}+1, \frac{1}{2}\right)\exp\left\{5.2j\frac{\alpha}{K^2}\left(k-\frac{K}{2}\right)^2\right\},$$

with $k=1, 2, \ldots, K$, and where the rectangle function Rect( ) is defined by $$Rect\left(k, K, \frac{K}{2}+1, \beta\right) = \begin{cases} 1, & \frac{K}{2}+1-\frac{\beta}{2}K < k < \frac{K}{2}+\frac{\beta}{2}K \\ 0, & \text{elsewhere} \end{cases}$$

and the constrained least squares function is $$CLS(k, K_1, K_2, K_3, K_4) = \begin{cases} \frac{k-K_1}{K_2-K_1}, & K_1 < k < K_2 \\ 1, & K_2 < k < K_3 \\ \frac{K_4-k}{K_4-K_3}, & K_3 < k < K_4 \end{cases}$$

Figure 8C:
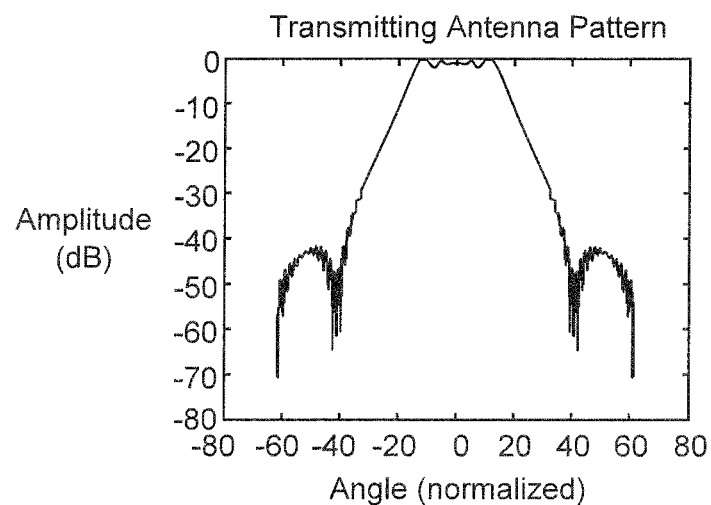
FIG. 8C is a graph of the amplitude of the computed transmitting antenna pattern corresponding to the weights of FIGS. 8A and 8B.
Figure 8D:
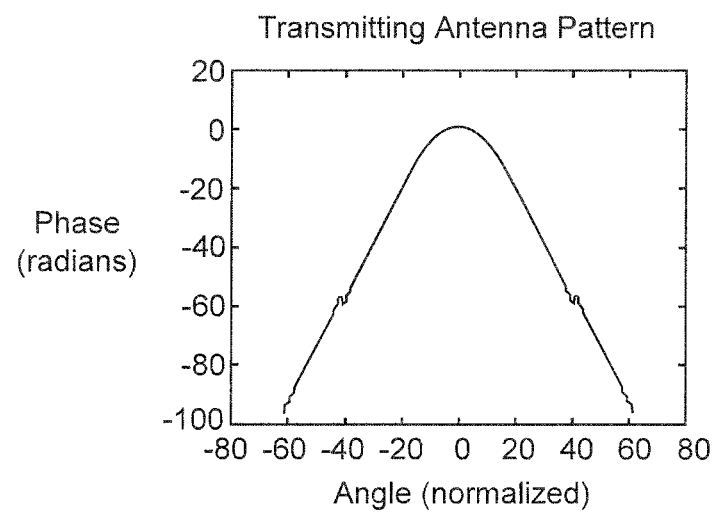
FIG. 8D is a graph of the phase of the computed transmitting antenna pattern corresponding to the weights of FIGS. 8A and 8B.

Referring to FIG. 8C, these weights generate a transmitting antenna pattern having a wide nearly uniform main lobe, with ripple of approximately 3 dB. The transmitting beam power loss is 3.43 dB in this embodiment because, when the antenna is transmitting, only the elements in the central region of the array, which spans approximately one half of the width of the array, are driven.

Figure 9A:
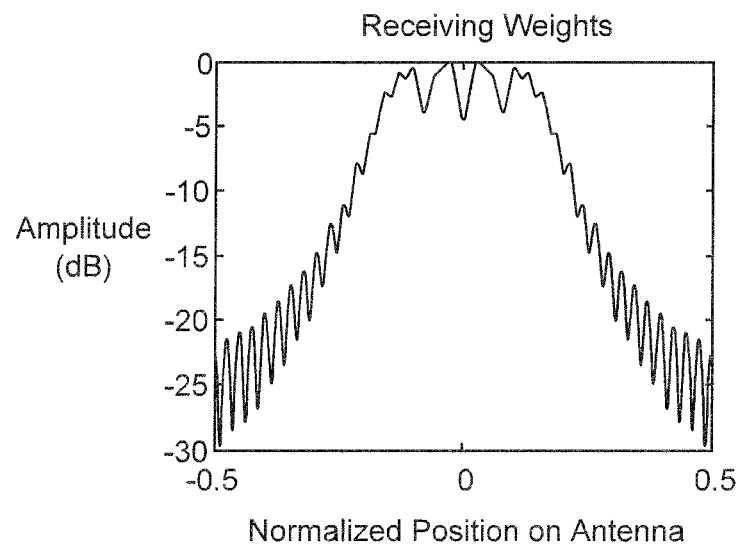
FIG. 9A is a graph of the amplitude of a set of receiving weights calculated for the transmitting weights of FIGS. 8A and 8B according to an embodiment of the present invention.
Figure 9B:
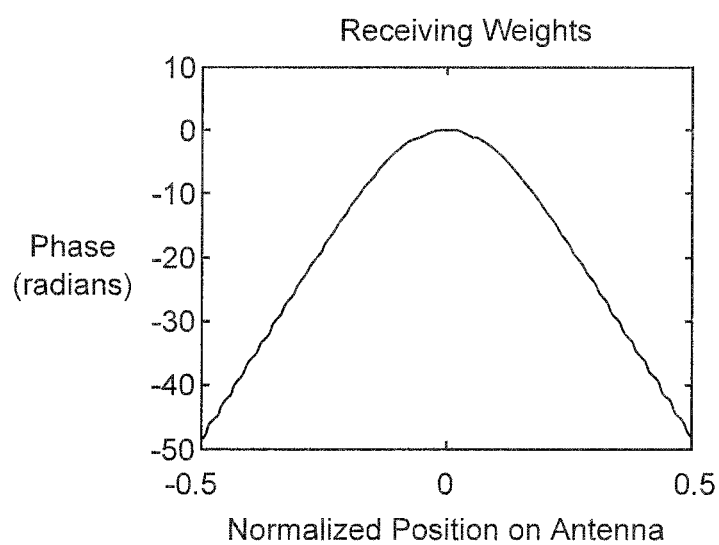
FIG. 9B is a graph of the phase of a set of receiving weights calculated for the transmitting weights of FIGS. 8A and 8B according to an embodiment of the present invention.
Figure 9C:
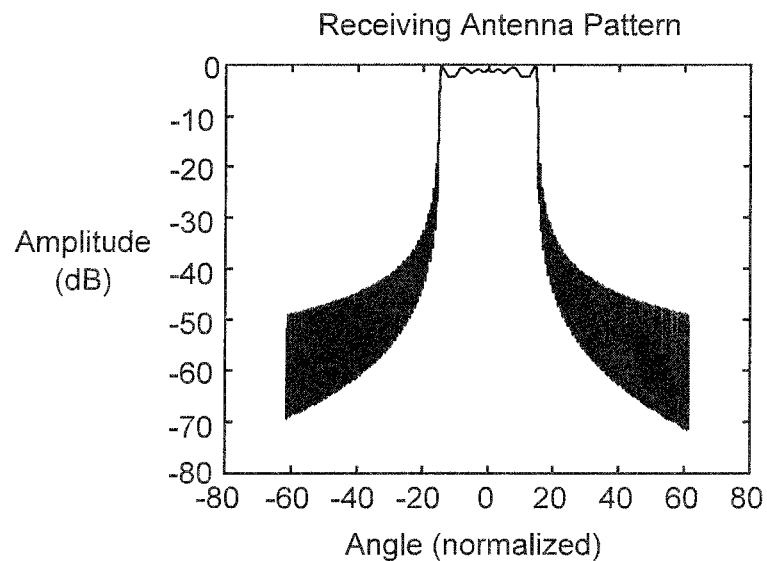
FIG. 9C is a graph of the amplitude of the computed receiving antenna pattern corresponding to the weights of FIGS. 9A and 9B.
Figure 9D:
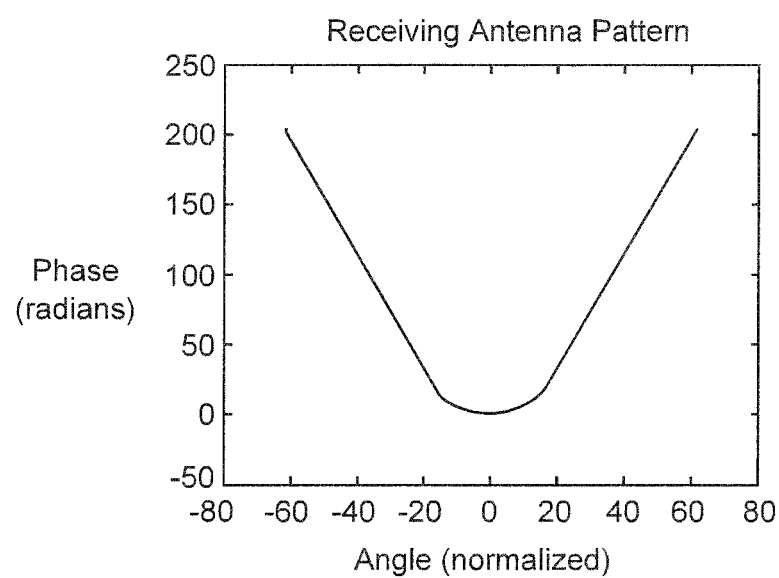
FIG. 9D is a graph of the phase of the computed receiving antenna pattern corresponding to the weights of FIGS. 9A and 9B.

In this embodiment, receiving weights may also be generated using the algorithm disclosed above and illustrated in FIG. 5. Referring to FIGS. 9A and 9B, the receiving weights resulting from the use of this algorithm are, like the transmitting weights, generally greater near the center of the array, and have approximately quadratic phase. Referring to FIGS. 9C and 9D, the receiving antenna pattern has, like the transmitting antenna pattern, a wide nearly uniform main lobe, with ripple of approximately 3 dB.

Figure 10A:
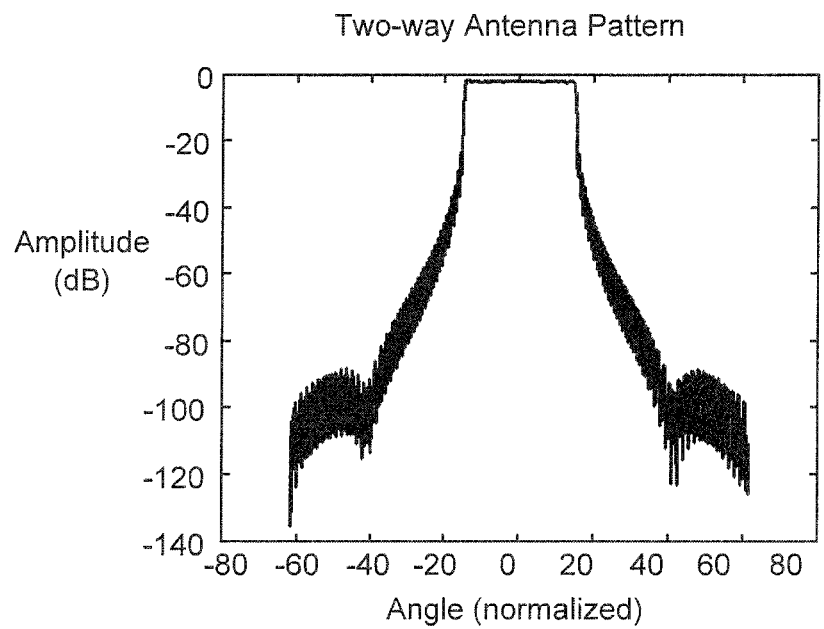
FIG. 10A is a graph of the amplitude of the two-way antenna pattern according to an embodiment of the present invention.
Figure 10B:
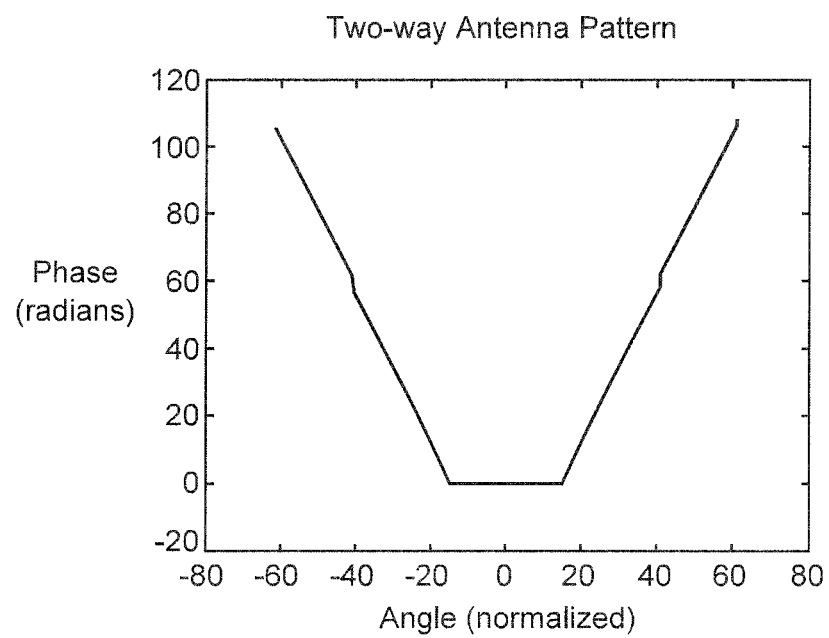
FIG. 10B is a graph of the phase of the two-way antenna pattern according to an embodiment of the present invention.

Referring to FIG. 10A, in this embodiment the two-way antenna pattern which results has a main lobe with amplitude ripple of less than 0.5 dB peak to peak, and within the range of angles covered by the main lobe, the phase is essentially constant, varying by less than 0.15 radian (FIG. 10B). The weight loss for the transmitting and receiving antenna patterns is 16.6 dB and 15.7 dB respectively. The two-way antenna pattern has a loss of 35.7 dB, including transmitting power loss and transmitting and receiving weight loss; this exceeds the theoretical minimum achievable loss, of $-20 \log_{10}(1/30)$, by 6.2 dB. The two-way antenna pattern has an exceeding fast sidelobe drop rate, allowing a PRF to main beam ratio of 1.3 to be used.

Although limited embodiments of methods of providing a broadened beam with large spoil factors have been specifically described and illustrated herein, many modifications and variations will be apparent to those skilled in the art. Accordingly, it is to be understood that methods of providing a broadened beam with large spoil factors employed according to principles of this invention may be embodied other than as specifically described herein. The invention is also defined in the following claims, and equivalents thereof.

What is claimed is:

1. A method for operating an active electronically scanned array (AESA) antenna to generate a desired two-way antenna pattern, the antenna having an array of antenna elements, the method comprising:
    selecting transmitting weights having substantially uniform amplitude over a portion of the array;
    computing a transmitting antenna pattern corresponding to the transmitting weights;
    computing receiving weights;
    programming the AESA antenna with the transmitting weights and the receiving weights; and
    operating the AESA antenna,
    wherein the computing of the receiving weights comprises selecting receiving weights to produce a receiving antenna pattern which, over a range of angles, is the ratio of (i) the desired two-way antenna pattern to (ii) the computed transmitting antenna pattern, and
    wherein the desired two-way antenna pattern has substantially uniform amplitude over the range of angles.

2. The method of claim 1, wherein the selecting of transmitting weights having substantially uniform amplitude over a portion of the array comprises selecting transmitting weights having substantially uniform amplitude over the entire array.

3. The method of claim 1, wherein the selecting of transmitting weights having substantially uniform amplitude over a portion of the array further comprises selecting transmitting weights having substantially quadratic phase over the portion of the array.

4. The method of claim 1, wherein the range of angles is a range of angles over which the amplitude of the transmitting antenna pattern falls short of the maximum amplitude of the transmitting antenna pattern by less than a threshold amount.

5. The method of claim 4, wherein the threshold amount is 3 dB.

6. The method of claim 1, wherein the computing of a transmitting antenna pattern comprises performing a fast Fourier transform and a circular shift.

7. The method of claim 1, wherein the computing selecting of receiving weights comprises performing a fast Fourier transform and two circular shifts.

8. The method of claim 1, wherein the selecting of transmitting weights having substantially uniform amplitude over a portion of the array comprises selecting transmitting weights having uniform, unit amplitude over a central portion of the array, and decreasing to substantially zero over transition regions on each side of the central portion.

9. The method of claim 8, wherein the selecting of transmitting weights having uniform, unit amplitude over a central portion of the array, and decreasing to substantially zero over transition regions on each side of the central portion comprises selecting transmitting weights decreasing to substantially zero following a constrained least squares function over transition regions on each side of the central portion.

10. The method of claim 8, wherein the central portion of the array comprises at least the central one quarter of the array, and at most the central three quarters of the array.

11. The method of claim 1, wherein the desired two-way antenna pattern has substantially constant phase over the range of angles.

12. An active electronically scanned array (AESA) antenna, comprising:
    an array of antenna elements;
    a plurality of phase and amplitude control circuits for producing a transmitting antenna pattern, a receiving antenna pattern, and a two-way antenna pattern;
    a plurality of transmitting weights for setting the relative amplitude and phase of the signal transmitted by each array element; and
    a plurality of receiving weights for setting the relative amplitude and phase of the signal received by each array element; wherein:
        the transmitting weights have substantially uniform amplitude over a portion of the array; and
        the receiving weights are selected to produce a receiving antenna pattern which, over a range of angles, is the ratio of (i) a desired two-way antenna pattern to (ii) a computed transmitting antenna pattern corresponding to the transmitting weights, wherein the desired two-way antenna pattern has substantially uniform amplitude over the range of angles.

13. The AESA antenna of claim 12, wherein the transmitting weights have substantially uniform amplitude over the entire array.

14. The AESA antenna of claim 12, wherein, within the range of angles, the amplitude of the transmitting antenna pattern differs from the maximum amplitude of the transmitting antenna pattern by less than a threshold amount.

15. The AESA antenna of claim 14, wherein the threshold amount is 3 dB.

16. The AESA antenna of claim 12, wherein the computed transmitted antenna pattern is a circularly shifted fast Fourier transform of the transmitting weights.

17. The AESA antenna of claim 12, wherein the transmitting weights have
    uniform, unit amplitude over a central portion of the array, and
    amplitude decreasing to substantially zero over transition regions on each side of the central portion.

18. The AESA antenna of claim 17, wherein the transmitting weights in the transition regions are a constrained least squares function of angle.

19. The AESA antenna of claim 17, wherein the central portion of the array comprises at least the central one quarter of the array, and at most the central three quarters of the array.

* * * * *